UNITED STATES PATENT OFFICE.

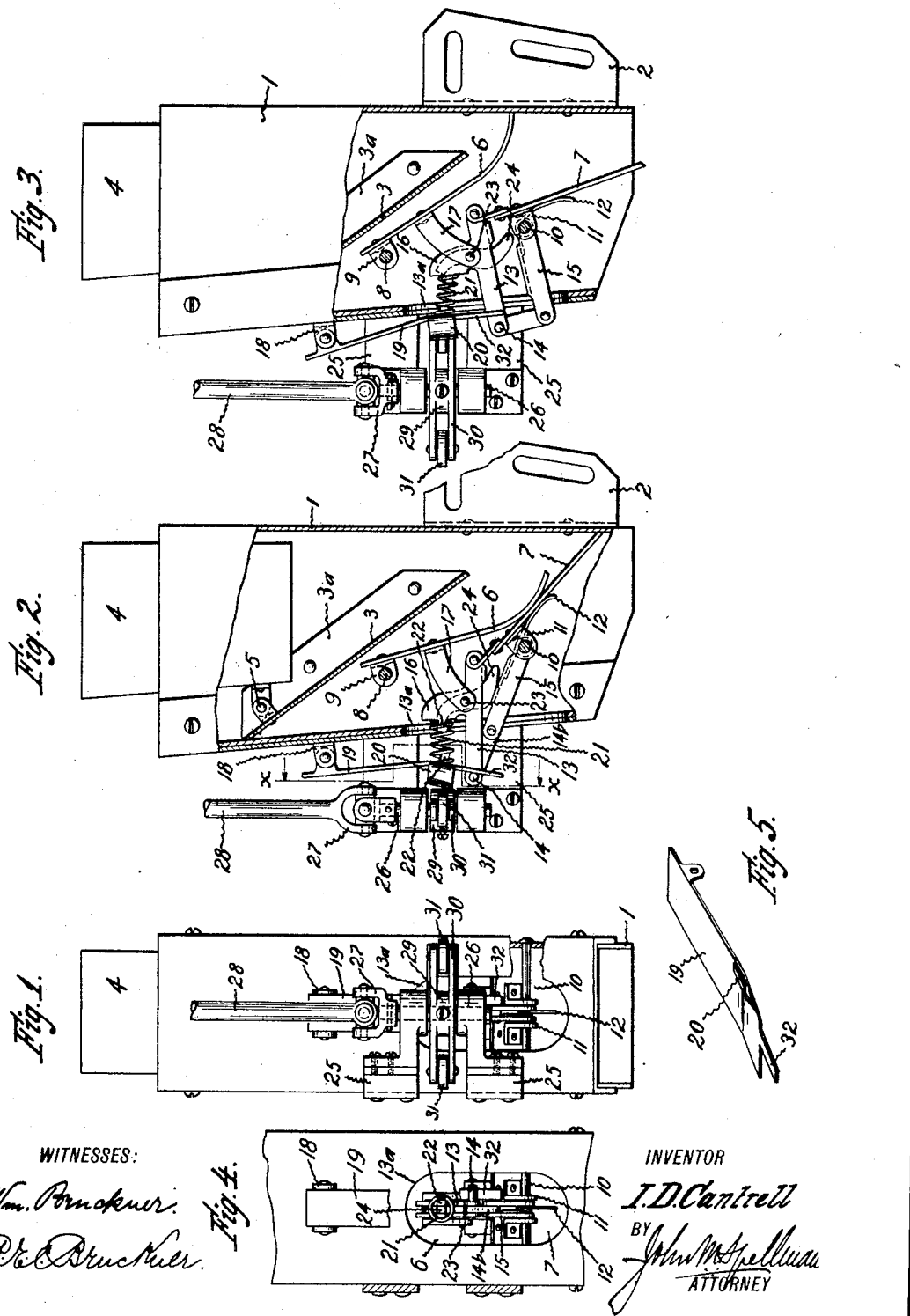

ISAAC D. CANTRELL, OF AUBREY, TEXAS.

SEED-CHUTE VALVE MECHANISM.

1,108,131.  Specification of Letters Patent.  Patented Aug. 25, 1914.

Application filed November 22, 1913. Serial No. 802,409.

*To all whom it may concern:*

Be it known that I, ISAAC D. CANTRELL, a citizen of the United States, residing at Aubrey, in the county of Denton and State of Texas, have invented certain new and useful Improvements in Seed-Chute Valve Mechanism, of which the following is a specification.

My invention relates to a new and useful seed chute valve mechanism. Its object is to provide an automatic mechanism for alternately opening and closing two valves, disposed one above the other within a seed chute, the operation of said valves being accurately regulated so as to cause a certain quantity of seed to be discharged at predetermined periodic intervals of time.

A further object is to provide a device of the character described, that will be strong, durable, simple and efficient, and comparatively easy to construct, and also one the various parts of which will not be likely to get out of working order.

With these and various other objects in view, my invention has relation to certain novel features of the construction and operation an example of which is described in the following specification and is illustrated in the accompanying drawing, wherein:

Figure 1 is a rear view of a seed chute, with which my novel valve mechanism is correlated. Fig. 2 is a view of the same in part section and part side elevation, the upper and lower valves being shown respectively open and closed. Fig. 3 is a similar view showing the upper valve closed and the lower one open. Fig. 4 is a fragmentary vertical sectional view, taken upon the line *x—x* of Fig. 2. Fig. 5 is a detail perspective view of a tripping lever, which is embodied in the invention.

Referring now more particularly to the drawing, wherein like reference characters designate similar parts in all the figures, the numeral 1 denotes a seed-chute preferably formed of sheet-metal, and having rigidly secured to its front wall a bracket 2 which may serve to attach the chute to the standard of an opening plow (not shown). Within the upper portion of the chute there is disposed an inclined metal platform 3, having upstanding flanges 3ª formed upon its lateral edges, and respectively riveted to the side walls of the chute. The upper extremity of the platform 3 is contiguous with the rear wall of the chute 1, and the lower end of said platform is spaced slightly from the front wall of the chute. Above the platform 3, there is mounted a supplementary chute 4, considerably smaller than the chute 1, and projecting some distance above the same. The chute 1 will participate in the vertical adjustment to which the opening plow (not shown) may be subjected, and since the supplementary chute 4 will not be included in this adjustment, there must be allowed some play between the main and supplementary chutes. The latter chute therefore is pivotally supported by the platform 3, as is indicated at 5.

In the lower portion of the chute 1, there are mounted upper and lower valves 6 and 7, the former normally being open and the latter closed. When closed, both valves have an inclination of approximately 45°, their lower ends being at such times contiguous with the front wall of the chute. When open, the valves are swung to a more acute inclination. The upper valve is pivotally mounted upon a horizontal pin 8, passing through a bracket 9, carried by the upper extremity of the valve. The lower valve is pivotally mounted upon a horizontal pin 10, passing through a pair of brackets 11 carried by said valve adjacent to its upper end. A wire spring 12 coiled upon the pin 10 has an extremity bearing upon the valve 7, tending to maintain the same in its closed position.

With the upper extremity of the valve 7, there is pivotally connected the forward ends of a pair of swinging links 13, projecting at their rear ends through an aperture 13ª in the rear wall of the chute 1. Exterior to the chute 1, the links 13 are connected by a pivot pin 14 with one end of another swinging link 14ᵇ, from the other end of which a pair of swinging links 15 is extended through the aperture 13ª to the pin 10. When the valve 7 is open, the members 13, 14ᵇ and 15 together with the upper portion of said valve, assume substantially the form of a parallelogram, and when the valve 7 is in its closed position, the links 14ᵇ and 15 are in alinement, as shown in Fig. 2. Upon the links 13 there are intermediately formed opposite upstanding projections 16, and a bracket 17 rigidly projecting from the valve 6 has pivotal connection with the links 13 at their juncture with the member 16. The relation thus established between the two valves is such that the valve 7 in assuming the closed position to which it is normally impelled by the spring 12, maintains the valve 6 open. When either of said valves is shifted from one of its limiting positions to the other one, the other valve will simultaneously undergo a reverse displacement. When the two valves have assumed the positions shown in Fig. 2, the upper one being open and the lower closed, they will be locked against any displacement until the links 14$^b$ and 15 are thrown out of alinement.

Upon the rear wall of the chute 1, there is mounted fast a small bracket 18, furnishing a pivotal support for the upper extremity of a tripping lever 19. At its lower end the lever 19 terminates opposite the aperture 13$^a$ and is formed with a curved lateral projection 20. Between the member 16 and the lever 19, there is interposed a coiled spring 21, supported by knobs 22, respectively formed upon said parts 16 and 19, which spring normally holds the lower end of the lever 19 spaced a slight distance rearwardly from the chute. Upon the pin 23 connecting the bracket 17 with the links 13, there is pivoted a cam 24 having oppositely turned extremities, one of which normally has contact with the upper edges of the links 15, while the other projects into the coils of the spring 21, beyond the knobs 22 formed upon the projections 16. When the lever 19 is displaced from the position illustrated in Fig. 2 to that shown in Fig. 3, compressing the spring 21, the knob 22 carried by the lever 19 will contact with the cam 24 just as the lever completes its motion, and will subject the cam to a sufficient degree of rotation to produce a slight angle between the links 14$^b$ and 15. After this has been accomplished, the valves 6 and 7 will no longer be locked in the position shown in Fig. 2, and the spring 21, expanding, will immediately shift the valves and the link mechanism to the position shown in Fig. 3, said parts being held in this position as long as the lever 19 remains displaced closely adjacent to the chute.

A description will now be given of a mechanism employed to automatically produce a periodic angular displacement of the lever 19. Upon the chute 1 are mounted two adjacent bearings 25 spaced rearwardly from the aperture 13$^a$, and receiving a short vertical shaft 26, connected at its upper end through a universal joint 27 with a drive shaft 28. Any desired mechanism may be employed to communicate a constant rotation to the shaft 28 during the travel of the planter with which my invention is correlated, one such mechanism being described and illustrated in my co-pending application, filed September 5, 1913, under Serial Number 788,269. Upon the shaft 26, between the two bearings 25, there is mounted fast a collar 29, from which two pairs of brackets 30 are extended in opposite directions. Between the members comprising each pair of brackets 30, there is mounted a roller 31, the two rollers 31 being spaced an equal distance from the shaft 26. The lower end of the lever 19 normally lies in the rotary path of travel of the rollers 31, so that each roller will come into contact with the portion 20 of the lever once in each revolution of the shaft, thus displacing the lever to the position shown in Fig. 3, and causing the valves to momentarily assume the position shown in the same figure. By locking the two valves against any movement from their normal positions until the spring 21 is fully compressed, a very quick and positive motion of the valves is secured when the locking device is released. The valves will occupy the positions shown in Fig. 3 only during the brief intervals in which the lever 19 is held displaced by the rollers 31. As soon as the lever is freed from engagement with one of the rollers, it will be returned to its normal position by the spring 21 and the spring 12 will immediately return the two valves to their normal positions. The pin 14, establishing pivotal connection between the links 13 and 14$^b$ projects sufficiently from the correlated links to act as a stop, limiting the rearward displacement to which the lever 19 is subjected by the spring 21, said lever being formed at its lower end with a finger 32 adapted to abut against said pin 14.

From the foregoing description of my invention, the manner of its operation is apparent. During the travel of the planter with which my invention is correlated, there will be a constant discharge of seed from the seed can, as in the case of any ordinary planter. The seed thus discharged will be conducted through the supplementary chute 4 to the platform 3, from which they will be deflected into the pocket formed between the lower valve 7 and the front and side walls of the chute 1. The speed of rotation of the shaft 26 will be such that time will be allowed for a certain quantity of seed to accumulate in said pocket before the lever 19 is displaced. The momentary displacement of the lever 19 will maintain the lower valve 7 open for the instant necessary to permit the accumulation of seed to be discharged, the upper valve 6 being closed to catch seed falling during this interval. As the lever 19 returns to its normal position, the upper valve will immediately open, discharging such seed as have accumulated upon it, and the lower valve will at the same time close, catching said seed. This operation is continuously and regularly repeated during the travel of the planter, so that the distance between the hills will be accurately maintained the same, and substantially the same number of seed will be deposited in each hill.

The invention is presented as including all such modifications and changes as properly come within the scope of the following claims.

What I claim is:

1. In a device of the character described, the combination with a seed-chute, of two valves mounted therein, one above the other, the upper valve being normally open and the lower one closed, a connection between the valves, maintaining either one open when the other is closed, a spring tending to return the valves to their normal positions after a displacement, a linkage locking the valves against displacement when they occupy their normal positions, a spring tending, when compressed to close the upper door and open the lower one, a cam correlated with said linkage, normally permitting the same to remain locked, but serving to unlock the same when subjected to a slight rotation, and a rotating member mounted exterior to the chute, periodically acting upon the last mentioned spring, compressing the same, and also subjecting the cam to a sufficient rotation to unlock the linkage after the spring has been compressed.

2. In a device of the character described, the combination with a seed-chute, of two valves mounted therein one above the other, the upper valve being normally open, and the lower one closed, a connection between the valves, maintaining either one open, when the other is closed, a linkage locking the valves against displacement when they occupy their normal positions, a spring tending to return the valves to their normal positions after a displacement, a spring tending when compressed to close the upper door and open the lower one, a cam correlated with said linkage, normally permitting the same to remain locked, but serving to unlock the same when subjected to a slight rotation, a tripping lever exteriorly pivoted upon the chute, normally occupying one limiting position, a displacement of said lever to its other limiting position, serving first to compress said spring and then to subject said cam to a sufficient rotation to unlock the linkage, and a rotating member, periodically acting upon the tripping lever to displace the same from its normal to its other limiting position.

3. In a device of the character described, the combination with a seed-chute, of two valves mounted therein, one above the other, the upper valve being normally open and the lower one closed, a connection between the valves maintaining either one open when the other is closed, a spring tending to return the valves to their normal positions after a displacement, a spring tending when compressed to close the upper valve and open the lower one, a swinging linkage correlated with the valves and including two links which are alined with each other in the normal positions of the valves, locking the latter against displacement, a cam correlated with said linkage, normally permitting the same to remain locked, but serving to displace the two alined links to an angular relation when subjected to a slight rotation and a rotating member mounted exterior to the chute, periodically acting upon the last mentioned spring, compressing the same, and also subjecting the cam to a sufficient rotation to displace the two alined links to an angular relation.

In testimony whereof I have signed my name to this specification in the presence of two subscribing witnesses.

ISAAC D. CANTRELL.

Witnesses:
  S. C. HENDERSON,
  C. T. HODGES.

---

Copies of this patent may be obtained for five cents each, by addressing the "Commissioner of Patents, Washington, D. C."